(12) United States Patent
Hinckley et al.

(10) Patent No.: US 8,660,978 B2
(45) Date of Patent: Feb. 25, 2014

(54) DETECTING AND RESPONDING TO UNINTENTIONAL CONTACT WITH A COMPUTING DEVICE

(75) Inventors: Kenneth P. Hinckley, Redmond, WA (US); Michel Pahud, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 373 days.

(21) Appl. No.: 12/970,945

(22) Filed: Dec. 17, 2010

(65) Prior Publication Data

US 2012/0158629 A1 Jun. 21, 2012

(51) Int. Cl.
G06F 9/44 (2006.01)
G06N 7/02 (2006.01)
G06N 7/06 (2006.01)

(52) U.S. Cl.
USPC .......................................................... 706/52

(58) Field of Classification Search
USPC .................................. 706/52, 46, 45, 62, 15
See application file for complete search history.

(56) References Cited

U.S. PATENT DOCUMENTS

| | | | |
|---|---|---|---|
| 5,198,623 A | 3/1993 | Landmeier | |
| 5,414,227 A * | 5/1995 | Schubert et al. | 345/179 |
| 5,463,725 A | 10/1995 | Henckel et al. | |
| 5,625,833 A | 4/1997 | Levine et al. | |
| 5,867,163 A | 2/1999 | Kurtenbach | |
| 5,956,020 A | 9/1999 | D'Amico et al. | |
| 6,788,292 B1 | 9/2004 | Nako et al. | |
| 6,906,703 B2 | 6/2005 | Vablais et al. | |
| 7,231,609 B2 | 6/2007 | Baudisch | |
| 7,289,102 B2 | 10/2007 | Hinckley et al. | |
| 7,362,221 B2 | 4/2008 | Katz | |
| 7,400,316 B2 | 7/2008 | Appleyard et al. | |
| 7,532,196 B2 | 5/2009 | Hinckley | |
| 7,703,047 B2 | 4/2010 | Keely et al. | |
| 7,812,826 B2 | 10/2010 | Ording et al. | |
| 7,847,789 B2 | 12/2010 | Kolmykov-Zotov et al. | |
| 7,956,847 B2 | 6/2011 | Christie | |
| 8,228,292 B1 | 7/2012 | Ruiz et al. | |

(Continued)

FOREIGN PATENT DOCUMENTS

| | | | |
|---|---|---|---|
| KR | 10-2012-0005417 A1 | 1/2012 | |
| WO | 2009084809 A1 | 7/2009 | |

OTHER PUBLICATIONS

Android APIs "TouchPaint.java", Copyright (C) 2007 The Android Open Source Project.*
Bartlett, Joel F., "Rock 'n' Scroll Is Here to Stay," accessed at <<http://www.hpl.hp.com/techreports/Compaq-DEC/WRL-2000-3.pdf>>, Western Research Laboratory, Palo Alto, California, May 2000, 9 pages.

(Continued)

*Primary Examiner* — Jeffrey A Gaffin
*Assistant Examiner* — Ilya Traktovenko
(74) *Attorney, Agent, or Firm* — Dan Choi; Carole Boelitz; Micky Minhas

(57) ABSTRACT

A computing device is described herein for detecting and addressing unintended contact of a hand portion (such as a palm) or other article with a computing device. The computing device uses multiple factors to determine whether input events are accidental, including, for instance, the tilt of a pen device as it approaches a display surface of the computing device. The computing device can also capture and analyze input events which represent a hand that is close to the display surface, but not making physical contact with the display surface. The computing device can execute one or more behaviors to counteract the effect of any inadvertent input actions that it may detect.

20 Claims, 11 Drawing Sheets

(56) References Cited

U.S. PATENT DOCUMENTS

| | | | |
|---|---|---|---|
| 8,265,705 | B2 | 9/2012 | Lee |
| 2003/0076310 | A1 | 4/2003 | Kanzaki et al. |
| 2003/0164821 | A1 | 9/2003 | Rezania |
| 2004/0012575 | A1 | 1/2004 | Homer et al. |
| 2004/0047505 | A1 | 3/2004 | Ghassabian |
| 2004/0140962 | A1 | 7/2004 | Wang et al. |
| 2004/0203520 | A1* | 10/2004 | Schirtzinger et al. ........ 455/90.3 |
| 2005/0024346 | A1 | 2/2005 | Dupraz et al. |
| 2005/0079896 | A1* | 4/2005 | Kokko et al. .................. 455/566 |
| 2005/0179648 | A1 | 8/2005 | Barabe et al. |
| 2005/0216867 | A1 | 9/2005 | Marvit et al. |
| 2005/0253817 | A1* | 11/2005 | Rytivaara et al. ............. 345/173 |
| 2006/0012580 | A1 | 1/2006 | Perski et al. |
| 2006/0026535 | A1 | 2/2006 | Hotelling et al. |
| 2006/0109252 | A1* | 5/2006 | Kolmykov-Zotov et al. . 345/173 |
| 2006/0136840 | A1* | 6/2006 | Keely et al. ................... 715/808 |
| 2006/0146038 | A1 | 7/2006 | Park et al. |
| 2006/0177112 | A1 | 8/2006 | Yang et al. |
| 2006/0197750 | A1 | 9/2006 | Kerr et al. |
| 2006/0197753 | A1 | 9/2006 | Hotelling |
| 2006/0256008 | A1 | 11/2006 | Rosenberg |
| 2006/0267957 | A1* | 11/2006 | Kolmykov-Zotov et al. . 345/173 |
| 2006/0267958 | A1* | 11/2006 | Kolmykov-Zotov et al. . 345/173 |
| 2007/0002016 | A1 | 1/2007 | Cho et al. |
| 2007/0070051 | A1 | 3/2007 | Westerman et al. |
| 2007/0075965 | A1* | 4/2007 | Huppi et al. ................... 345/156 |
| 2007/0113198 | A1 | 5/2007 | Robertson et al. |
| 2007/0126732 | A1 | 6/2007 | Robertson et al. |
| 2007/0268274 | A1 | 11/2007 | Westerman et al. |
| 2008/0002888 | A1 | 1/2008 | Yuan |
| 2008/0012835 | A1 | 1/2008 | Rimon et al. |
| 2008/0040692 | A1 | 2/2008 | Sunday et al. |
| 2008/0158145 | A1 | 7/2008 | Westerman |
| 2008/0158168 | A1 | 7/2008 | Westerman et al. |
| 2008/0163130 | A1 | 7/2008 | Westerman |
| 2008/0191898 | A1 | 8/2008 | Janik |
| 2009/0066663 | A1 | 3/2009 | Chang et al. |
| 2009/0073144 | A1 | 3/2009 | Chen et al. |
| 2009/0109182 | A1 | 4/2009 | Fyke et al. |
| 2009/0153525 | A1 | 6/2009 | Chang |
| 2009/0160816 | A1 | 6/2009 | Westerman et al. |
| 2009/0167702 | A1* | 7/2009 | Nurmi ........................... 345/173 |
| 2009/0178007 | A1 | 7/2009 | Matas et al. |
| 2009/0209285 | A1* | 8/2009 | McMahan .................. 455/556.1 |
| 2009/0262074 | A1* | 10/2009 | Nasiri et al. ................... 345/158 |
| 2009/0265671 | A1* | 10/2009 | Sachs et al. .................... 715/863 |
| 2009/0267896 | A1 | 10/2009 | Hiramatsu |
| 2010/0007618 | A1 | 1/2010 | Park et al. |
| 2010/0020025 | A1 | 1/2010 | Lemort et al. |
| 2010/0045705 | A1 | 2/2010 | Vertegaal et al. |
| 2010/0053095 | A1 | 3/2010 | Wu et al. |
| 2010/0053120 | A1* | 3/2010 | Chang et al. .................. 345/179 |
| 2010/0083191 | A1 | 4/2010 | Marshall |
| 2010/0095234 | A1 | 4/2010 | Lane et al. |
| 2010/0103118 | A1 | 4/2010 | Townsend et al. |
| 2010/0123737 | A1 | 5/2010 | Williamson et al. |
| 2010/0127979 | A1 | 5/2010 | Lee et al. |
| 2010/0139990 | A1* | 6/2010 | Westerman et al. ........ 178/18.03 |
| 2010/0175018 | A1 | 7/2010 | Petschnigg et al. |
| 2010/0188328 | A1 | 7/2010 | Dodge et al. |
| 2010/0194547 | A1* | 8/2010 | Terrell et al. ............... 340/407.2 |
| 2010/0281435 | A1 | 11/2010 | Bangalore et al. |
| 2010/0295781 | A1 | 11/2010 | Alameh et al. |
| 2010/0295799 | A1 | 11/2010 | Nicholson et al. |
| 2010/0306670 | A1 | 12/2010 | Quinn et al. |
| 2010/0328227 | A1 | 12/2010 | Matejka et al. |
| 2011/0115741 | A1 | 5/2011 | Lukas et al. |
| 2011/0167357 | A1 | 7/2011 | Benjamin et al. |
| 2011/0193788 | A1 | 8/2011 | King et al. |
| 2011/0197153 | A1 | 8/2011 | King et al. |
| 2011/0221777 | A1 | 9/2011 | Ke |
| 2011/0231796 | A1 | 9/2011 | Vigil |
| 2012/0154293 | A1 | 6/2012 | Hinckley et al. |
| 2012/0154294 | A1 | 6/2012 | Hinckley et al. |
| 2012/0154295 | A1 | 6/2012 | Hinckley et al. |
| 2012/0154296 | A1 | 6/2012 | Hinckley et al. |

OTHER PUBLICATIONS

Buxton, William, "Lexical and Pragmatic Considerations of Input Structure," retrieved at <<http://acm.org>>, ACM SIGGRAPH Computer Graphics, vol. 17, Issue 1, Jan. 1983, pp. 31-37.

Buxton, William, "Chunking and Phrasing and the Design of Human-Computer Dialogues," retrieved at <<http://www.billbuxton.com/chunking.pdf>>, Proceedings of the IFIP World Computer Congress, 1986, 9 pages.

Buxton, William, "A Three-State Model of Graphical Input," retrieved at <<http://www.billbuxton.com/3state.html>>, in D. Diaper, et al. (Eds), Human-Computer Interaction—Interact '90, Amsterdam: Elsevier Science Publishers B.V. (North-Holland), 8 pages.

Card, et al., "The Design Space of Input Devices," retrieved at <<http://acm.org>>, CHI '90 Proceedings of the SIGCHI Conference on Human factors in computing Systems, 1990, pp. 117-124.

Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, 2008, pp. 1779-1788.

Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mobile Devices and Services, 2007, pp. 190-197.

Chun, et al., "Virtual Shelves: Interactions with Orientation-Aware Devices," retrieved at <<http://acm.org>>, UIST'09, 2009, pp. 125-128.

Cohen, et al., "Synergistic Use of Direct Manipulation and Natural Language," retrieved at <<http://acm.org>>, CHI '89 Proceedings of the SIGCHI Conference on Human Factors in Computing Systems, 1989, pp. 227-233.

Eslambolchilar, et al., "Tilt-Based Automatic Zooming and Scaling in Mobile Devices—A State-Space Implementation," retrieved at <<http://eprints.gla.ac.uk/2951/1/tilt2_based.pdf>>, 6th International Symposium on Mobile Human_Computer Interaction, 2004, Sep. 2004, 13 pages.

Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.

Harrison, et al., "Squeeze Me, Hold Me, Tilt Me! An Exploration of Manipulative User Interfaces," retrieved at <<http://acm.org>>, CHI '98 Proceedings of the SIGCHI Conference on Human Factors in Computing Systems, pp. 17-24.

Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, pp. 205-208.

Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.

Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), 1978, pp. 210-216.

Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, pp. 451-460.

Hinckley, et al., "Sensing Techniques for Mobile Interaction," retrieved at <<http://acm.org>>, UIST'00 Proceedings of the 13th Annual ACM Symposium on User Interface Software and Technology, pp. 91-100.

Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, pp. 2793-2802.

(56) References Cited

OTHER PUBLICATIONS

Hudson, et al., "Whack Gestures: Inexact and Inattentive Interaction with Mobile Devices," retrieved at <<http://acm.org>>, TEI '10 Proceedings of the fourth International Conference on Tangible, Embedded, and Embodied Interaction, pp. 109-112.
Iwasaki, et al., "Expressive Typing: A New Way to Sense Typing Pressure and Its Applications," retrieved at <<http://acm.org>>, CHI '09 Proceedings of the 27th International Conference Extended Abstracts on Human Factors in Computing Systems, pp. 4369-4374.
Joshi, et al., "Image Deblurring Using Inertial Measurement Sensors," retrieved at <<http://acm.org>>, ACM SIGGRAPH 2010, CHI 2009: Spotlight on Works in Progress—Session 2, pp. 4369-4374.
Kim, et al., "Hand Grip Pattern Recognition for Mobile User Interfaces," retrieved at <<http://www.aaai.org/Papers/IAAI/2006/IAAI06-013.pdf>>, IAAI'06 Proceedings of the 18th Conference on Innovative Applications of Artificial Intelligence, vol. 2, p. 1789-1794.
Kratz, et al., "Unravelling Seams: Improving Mobile Gesture Recognition with Visual Feedback Techniques,"retrieved at <<http://acm.org>>, CHI '09 Proceedings of the 27th International Conference on Human Factors in Computing Systems, 2009, pp. 937-940.
Liao, et al., "PACER: Fine-grained Interactive Paper via Camera-touch Hybrid Gestures on a Cell Phone," retrieved at <<http://acm.org>>, CHI '10 Proceedings of the 28th International Conference on Human Factors in Computing Systems, Apr. 2010, pp. 2441-2450.
Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, pp. 44-51.
Partridge, et al., "TiltType: Accelerometer-Supported Text Entry for Very Small Devices," retrieved at <<http://acm.org>>, UIST '02 Proceedings of the 15th Annual ACM Symposium on User Interface Software and Technology, 2002, pp. 201-204.
Rahman, et al., "Tilt Techniques: Investigating the Dexterity of Wrist-based Input," retrieved at <<http://acm.org>>, CHI '09 Proceedings of the 27th international Conference on Human Factors in Computing Systems, pp. 1943-1952.
Roudaut, et al., "TimeTilt: Using Sensor-Based Gestures to Travel through Multiple Applications on a Mobile Device," retrieved at << bencoenrico.free.fr/ENST/Home_files/roudaut_interactTime09.pdf>>, Interact '09, Proceedings of the 12th IFIP TC 13 International Conference on Human-Computer Interaction: Part I, 4 pages.
Schmidt, et al., "Advanced Interaction in Context," retrieved at <<http://citeseerx.ist.psu.edu/viewdoc/summary?doi=10.1.1.40.2408 >>, HUC '99, Proceedings of the 1st International Symposium on Handheld and Ubiquitous Computing, 13 pages.
Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.
Schwesig, et al., "Gummi: A Bendable Computer," retrieved at <<http://acm.org>>, CHI '04, Proceedings of the SIGCHI Conference on Human Factors in Computing Systems, 2004, pp. 263-270.
Sellen, et al., "The Prevention of Mode Errors through Sensory Feedback," retrieved at <<http://acm.org>>, Journal of Human-Computer Interaction, vol. 7, Issue 2, Jun. 1992, pp. 141-161.
Taylor, et al., "Graspables: Grasp-Recognition as a User Interface," retrieved at <<http://acm.org>>, CHI '09 Proceedings of the 27th International Conference on Human factors in Computing Systems, Apr. 2009, pp. 917-925.
Wigdor, et al., "TiltText:Using Tilt for Text Input to Mobile Phones," retrieved at <<http://acm.org>>, UIST '03, Proceedings of the 16th Annual ACM Symposium on User Interface Software and Technology, 2003, pp. 81-90.
Williamson, et al., "Shoogle: Excitatory Multimodal Interaction on Mobile Devices," retrieved at <<http://acm.org>>, CHI '07, Proceedings of the SIGCHI Conference on Human factors in Computing Systems, 2007, pp. 121-124.

Hassan, et al., "Chucking: A One-Handed Document Sharing Technique," T. Gross et al. (Eds.): Interact 2009, Part II, LNCS 5727, 2009, pp. 264-278.
Rekimoto, Jen, "Tilting operations for small screen interfaces," UIST '96, Proceedings of the 9th Annual ACM Symposium on User Interface Software and Technology, 1996, 167-168.
Bjørneseth, et al., "Dynamic Positioning Systems—Usability and Interaction Styles," retrieved at <<http://www.ceng.metu.edu.tr/~tcan/se705_s0809/Schedule/assignment3.pdf>>, Proceedings of the 5th Nordic Conference on Human-Computer Interaction: Building Bridges, Oct. 2008, 10 pages.
Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.
Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.
Ashbrook, et al., "Magic: A Motion Gesture Design Tool," retrieved at <<http://research.nokia.com/files/2010-Ashbrook-CHI10-MAGIC.pdf>>, Proceedings of the 28th International Conference on Human Factors in Computing Systems, Apr. 2010, 10 pages.
Hinckley, et al., "Foreground and Background Interaction with Sensor-Enhanced Mobile Devices," retrieved at <<http://research.microsoft.com/en-us/um/people/kenh/papers/tochisensing.pdf>>, ACM Transactions on Computer-Human Interaction, vol. 12, No. 1, Mar. 2005, 22 pages.
Kendrick, James, "ChromeTouch: Free Extension for Touch Tablets," retrieved at <<http://jkontherun.com/2010/05/06/chrometouch-free-extension-for-touch-tablets/>>, GigaOM, May 6, 2010, 9 pages.
Izadi, et al., "C-Slate: A Multi-Touch and Object Recognition System for Remote Collaboration using Horizontal Surfaces," retrieved at <<http://research.microsoft.com/en-us/um/people/shahrami/papers/cslate1.pdf>>, Second Annual IEEE International Workshop on Horizontal Interactive Human-Computer System, 2007, pp. 3-10.
Thurrott, Paul, "Windows XP Tablet PC Edition reviewed," retrieved at <<http://www.winsupersite.com/reviews/windowsxp_tabletpc.asp>>, Paul Thurrott's SuperSite for Windows, Jun. 25, 2002, 7 pages.
Hinckley, et al., "Direct Display Interaction via Simultaneous Pen + Multi-touch Input," retrieved at http://lily.billbuxton.com/SID10%2038-2.pdf>>, Society for Information Display (SID) Symposium Digest of Technical Papers, vol. 41, No. 1, May 2010, pp. 537-540.
"PenLab: Itronix GoBook Duo-Touch," retrieved at <<http://pencomputing.com/frames/itronix_duotouch.html>>, retrieved on Jun. 22, 2010, Pen Computing Magazine, 3 pages.
Babyak, Richard, "Controls & Sensors: Touch Tones", retrieved at <<http://www.appliancedesign.com/Articles/Controls_and_Displays/BNP_GUID_9-5-2006_A_100000000000000129366>>, Appliance Design, Jun. 30, 2007, 3 pages.
"International Search Report", Mailed Date: Jul. 31, 2012, Application No. PCT/US2011/065680, Filed Date: Dec. 17, 2011, pp. 13.
Joselli, et al., "gRmobile: A Framework for Touch and Accelerometer Gesture Recognition for Mobile Games", VIII Brazilian Symposium on Digital Games and Entertainment, IEEE, 2009, pp. 141-150.
"DuoSense Pen, Touch & Multi-Touch Digitizer," retrieved at <<http://www.n-trig.com/Data/Uploads/Misc/DuoSense_Brochure_FINAL.pdf>>, May 2008, N-trig Ltd., Kfar Saba, Israel, 4 pages.
Aliakseyeu, D., A. Lucero, S. Subramanian, Interacting with piles of artifacts on digital tables, Digital Creativity, Jul. 2007, pp. 161-174, vol. 18, No. 3.
Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.

(56) References Cited

OTHER PUBLICATIONS

Bi, et al., "An Exploration of Pen Rolling for Pen-Based Interaction", In Proceedings of the 21st Annual ACM Symposium on User Interface Software and Technology, Oct. 19, 2008, 10 pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.
Dachselt, et al., "Throw and Tilt—Seamless Interaction Across Devices Using Mobile Phone Gestures", Proceedings of the 34th Graphics Interface Conference, May 2008, 7 pages.
Döring, et al., "Exploring Gesture-Based Interaction Techniques in Multi-Display Environments with Mobile Phones and a Multi-Touch Table", Proceedings of the Workshop on Coupled Display Visual Interfaces, May 25, 2010, pp. 47-54.
Fitzmaurice, et al., "Tracking Menus", In Proceedings of the 16th Annual ACM Symposium on User Interface Software and Technology, Nov. 2, 2003, 10 pages.
Frisch, et al., "Investigating Multi-Touch and Pen Gestures for Diagram Editing on Interactive Surfaces", In ACM International Conference on Interactive Tabletops and Surfaces, Nov. 23, 2009, 8 pages.
Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.
Hinckley, et al., "Pen + Touch = New Tools", In Proceedings of the 23nd Annual ACM Symposium on User Interface Software and Technology, Oct. 3, 2010, 10 pages.
Hinckley, Ken, "Synchronous Gestures for Multiple Persons and Computers", In Proceedings of the 16th Annual ACM Symposium on User Interface Software and Technology, Nov. 2, 2003, 10 pages.
Hinckley, et al., "Touch-Sensing Input Devices", In Proceedings of the SIGCHI Conference on Human Factors in Computing Systems, May 15, 1999, 8 pages.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.
Kurtenbach, et al., "Issues in Combining Marking and Direct Manipulation Techniques", In Proceedings of the 4th Annual ACM Symposium on User Interface Software and Technology, Nov. 11, 1991, 8 pages.
Lester, et al., "Are You With Me?"—Using Accelerometers to Determine if Two Devices are Carried by the Same Person, In Proceedings of Second International Conference on Pervasive Computing, Apr. 21, 2004, 18 pages.
Li, et al., "Experimental Analysis of Mode Switching Techniques in Pen-Based User Interfaces", In Proceedings of the SIGCHI Conference on Human Factors in Computeing Systems, Apr. 2, 2005, 10 pages.
Mohamed, et al., "Disoriented Pen-Gestures for Identifying Users Around the Tabletop Without Cameras and Motion Sensors", Proceedings of the First IEEE International Workshop on Horizontal Interactive Human-Computer Systems (TABLETOP '06), Jan. 2006, 8 pages.
Mulroy, "N-Trig Pushes Pen and Multitouch Input", PC World, retrieved on Jan. 27, 2011 at <<http://www.pcworld.com/artide/196723/ntrig_pushes_pen_and_multitouch_input.html >>, May 19, 2010, 3 pages.
N-act Multi-Touch Gesture Vocabulary Set, retrieved date, Oct. 12, 2011, 1 page.
Ramos, et al., "Pressure Widgets", In Proceedings of the SIGCHI Conference on Human Factors in Computing Systems, vol. 6, Issue 1, Apr. 24, 2004, 8 pages.
Ramos, et al., "Tumble! Splat! Helping Users Access and Manipulate Occluded Content in 2D Drawings", In Proceedings of the Working Conference on Advanced Visual Interfaces, May 23, 2006, 8 pages.
Sachs, et al., "3-Draw: A Tool for Designing 3D Shapes", In Journal of IEEE Computer Graphics and Applications, vol. 11, Issue 6, Nov. 1991, 9 pages.
Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.
Subramanian, et al., "Multi-layer interaction for digital tables," In Proc. of the 19th Annual ACM Symposium on User Interface Software and Technology, Oct. 15, 2006, pp. 269-272.
Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.
Tian, et al., "The Tilt Cursor: Enhancing Stimulus-Response Compatibility by Providing 3D Orientation Cue of Pen", in Proceedings of the SIGCHI Conference on Human Factors in Computing Systems, Apr. 28, 2007, 4 pages.
Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.
"Using Windows Flip 3D", retrieved at ←http://windows.microsoft.com/en-US/windows-vista/Using-WindowsFlip-3D →, retrieved on Feb. 9, 2012, Microsoft Corporation, Redmond, WA, 1 page.
Verplaetse, C., "Inertial Proprioceptive Devices: Self-Motion-Sensing Toys and Tools", In IBM Systems Journal, vol. 35, Issue 3-4, Apr. 23, 2013, 12 pages.
Walker, Geoff, "Palm rejection on resistive touchscreens", Veritas et Visus, Nov. 2005, pp. 31-33.
Vvigdor, et al., "Lucid-Touch: A See-through Mobile Device," Proceedings of the 20th Annual ACM Symposium on User Interface Software and Technology, Oct. 2007, pp. 269-278.
Wilson, et al., "XWand: UI for Intelligent Spaces", In Proceedings of the SIGCHI Conference on Human Factors in Computing Systems, Apr. 5, 2003, 8 pages.
Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.
Yee, Ka-Ping, "Two-Handed Interaction on a Tablet Display", In Proceedings of Extended Abstracts on Human Factors in Computing Systems, Apr. 24, 2004, 4 pages.
Zelenik, et al., "Hands-On Math: A Page-Based Multi-Touch and Pen Desktop for Technical Work and Problem Solving", In Proceedings of the 23nd Annual Symposium on User Interface Software and Technology, Oct. 3, 2010, 10 pages.
Figueroa-Gibson, G., U.S. Office Action, U.S. Appl. No. 12/970,949, Jun. 21, 2013, 20 pages.
Figueroa-Gibson, G., U.S. Office Action, U.S. Appl. No. 12/970,943, Jun. 10, 2013, 21 pages.
Figueroa-Gibson, G., U.S. Office Action, U.S. Appl. No. 12/970,939, Jun. 5, 2013, 26 pages.
Figueroa-Gibson, G., U.S. Office Action, U.S. Appl. No. 12/970,939, Aug. 22, 2013.
Treitler, Damon, U.S. Office Action, U.S. Appl. No. 13/327,794, Oct. 16, 2013, 16 pages.
Zhou, Hong, U.S. Office Action, U.S. Appl. No. 13/026,058, Aug. 29, 2013.
Figueroa-Gibson, G., U.S. Final Office Action, U.S. Appl. No. 12/970,949, Nov. 29, 2013.
Figueroa-Gibson, G., U.S. Office Action, U.S. Appl. No. 12/970,939, Dec. 19, 2013.
Treitler, D., U.S. Final Office Action, U.S. Appl. No. 13/327,794, Dec. 19, 2013.

* cited by examiner

DETECTING AND RESPONDING TO UNINTENTIONAL CONTACT WITH A COMPUTING DEVICE

BACKGROUND

Handheld computing devices often allow users to input information by making direct contact with the display surfaces of the devices. For instance, a touch input mechanism provides touch input events when a user touches a display surface of the computing device with a finger (or multiple fingers). A pen input mechanism provides pen input events when a user touches the display surface with a pen device, also known as a stylus.

However, these types of interface mechanisms introduce a number of challenges. For instance, consider the case in which the computing device allows a user to input information using both a touch input mechanism and a pen input mechanism. In the course of applying a mark on the display surface with a pen device, the user may inadvertently rest his or her palm on the display surface. The computing device may then incorrectly interpret this inadvertent contact as legitimate input activity. A similar challenge may confront a user who is intentionally using the touch input mechanism. The user may attempt to apply a focused touch to a target object presented on the display surface, yet the user may accidently brush or bump his or her hand against other parts of the display surface, causing accidental input events. These problems may understandably frustrate the user if they become a frequent occurrence, or, even if uncommon, if they cause significant disruption in the task that the user is performing.

SUMMARY

A computing device is described herein for detecting and addressing unintended contact of a hand portion (or a pen device or other article) with a computing device. In one scenario, the hand portion may correspond to the palm of the hand which accidently contacts a display surface of the computing device when the user attempts to apply a mark on the display surface with a pen device.

According to one illustrative implementation, the computing device can receive input events associated with an input action from plural input mechanisms. At least one of the input mechanisms comprises a touch input mechanism for providing at least one touch input event that indicates contact of a hand with the display surface. The computing device then assesses a level of confidence that at least part of an input action represents an unintentional contact with the display surface. The computing device then applies at least one behavior to counteract effects of the unintentional contact (if it is assessed as being present).

The computing device can use multiple factors in determining whether an input action is accidental. The multiple factors can be selected from the following illustrative and non-exhaustive list: position information that indicates a position of at least one of the hand and a pen device during the input action; pen orientation information which indicates an orientation at which the pen device is held in the hand during the input action; device orientation information that indicates an orientation of the computing device during the input action; device motion information that indicates motion of the computing device during the input action; contact shape information which indicates a shape associated with the touch input event(s); progression information which indicates a temporal progression associated with the application of any input events; and user behavior information which indicates a manner in which a user is performing the input action (such as whether the user is using a right hand or left hand to perform the input action), and so on.

According to another illustrative feature, the computing device can repeat its interpretation of an input action throughout the temporal progression of the input action. As a result, the computing device may gradually increase its level of confidence at which it has classified the input action, or abandon an interpretation if it proves to be unlikely, etc.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing device having functionality for detecting and rejecting inadvertent input events. Section B describes illustrative methods which explain the operation of the computing device. Section C describes illustrative processing functionality that can be used to implement any aspect of the features described in Sections A and B.

Figure 13:
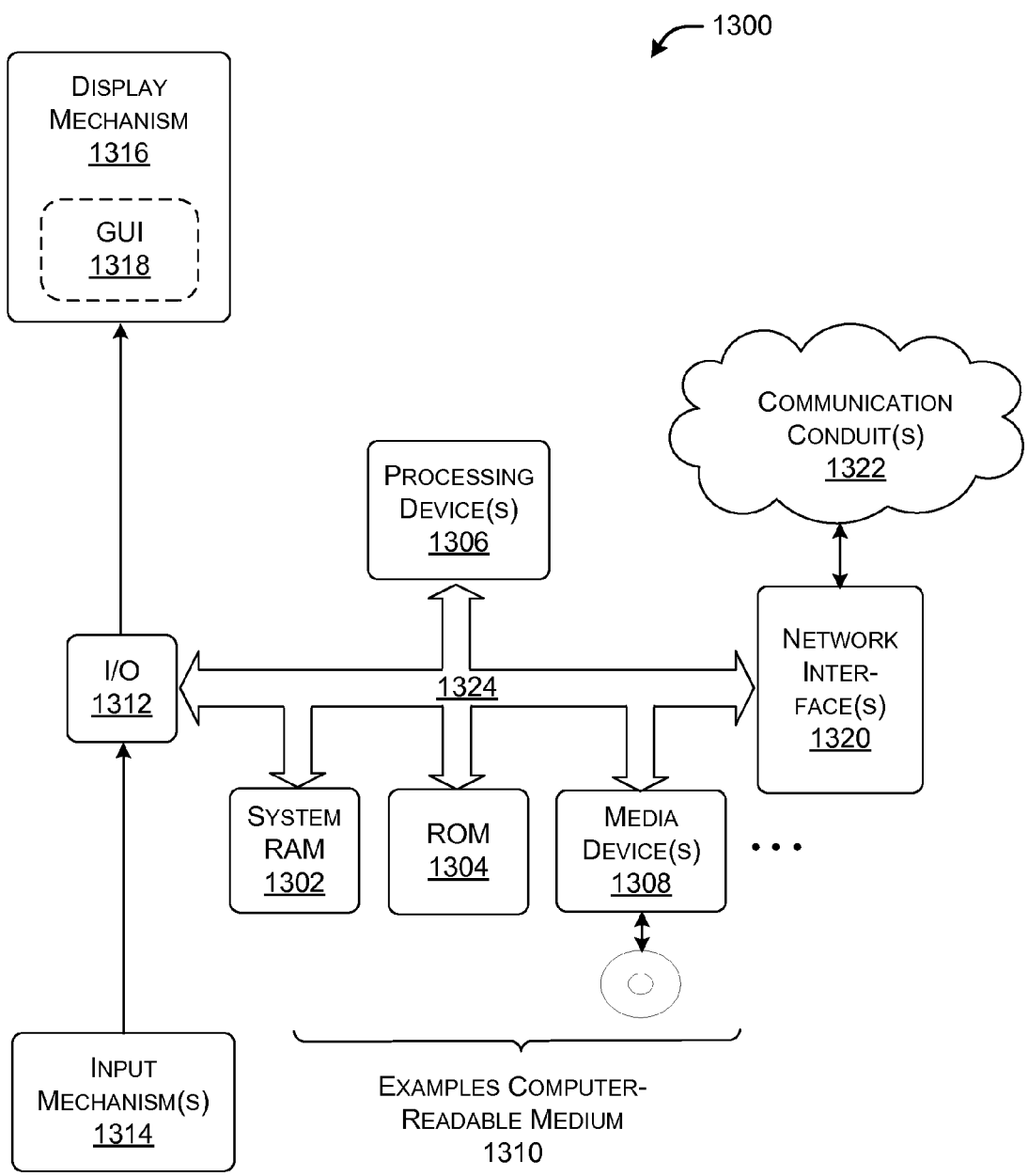
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (such as by hardware, software, firmware, etc., or any combination thereof). In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 13, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (such as by hardware, software, firmware, etc., or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Computing Devices

A.1. Overview

Figure 1:
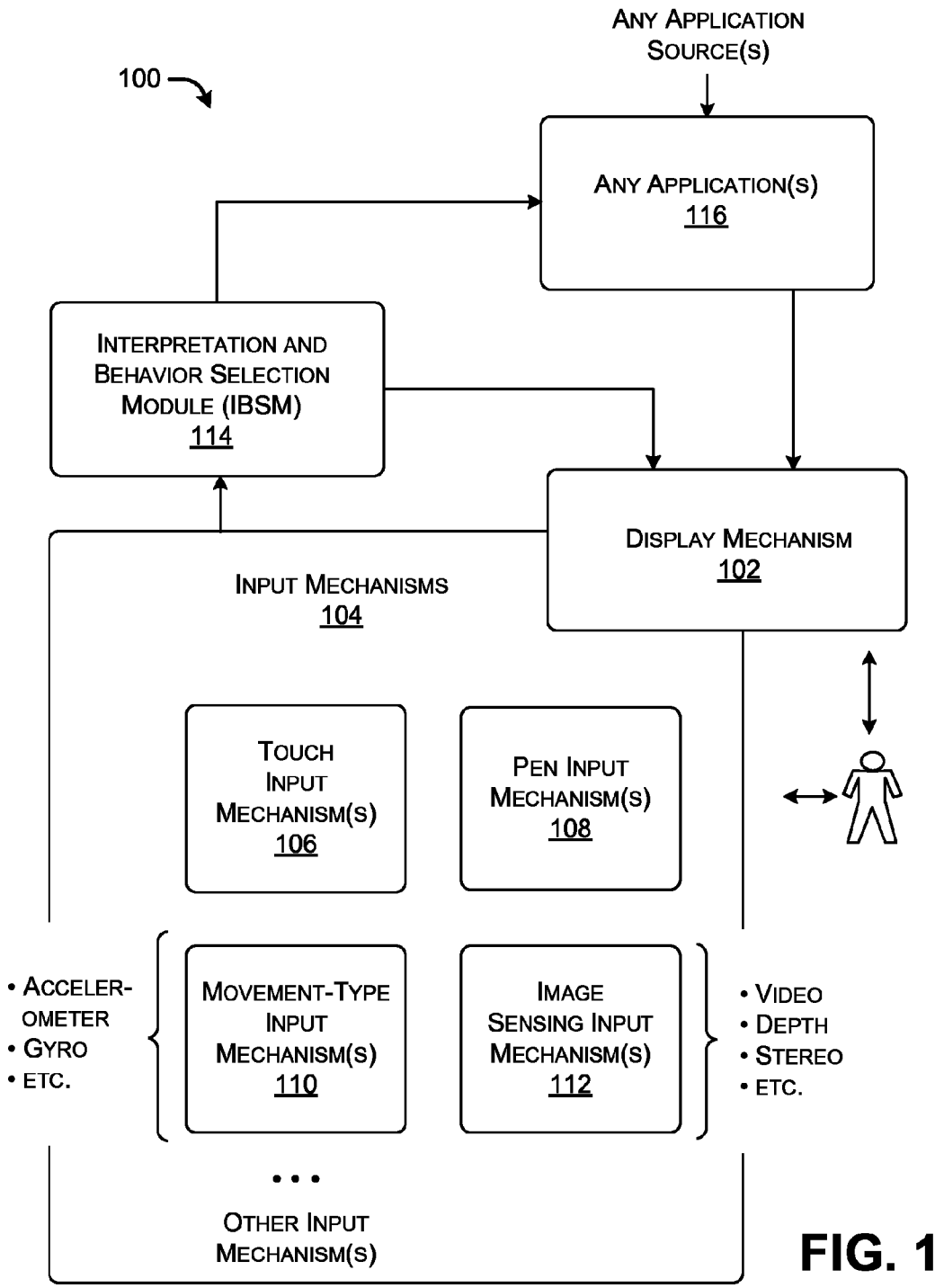
FIG. 1 shows an illustrative computing device that includes functionality for rejecting inadvertent contact of a hand portion (such as a palm) or other article with a computing device.

FIG. 1 shows an example of a computing device 100 for detecting and addressing accidental contact of a hand portion with a computing device 100. In many of the examples presented here, the "hand portion" corresponds to the palm of the hand. But the hand portion which causes the accidental contact can also correspond to the knuckles of the hand, the side of the pinky finger, and so on. The term hand portion can also encompass multiple parts of a hand.

The computing device 100 may optionally include a display mechanism 102 in conjunction with various input mechanisms 104. The display mechanism 102 provides a visual rendering of digital information on a display surface. The display mechanism 102 can be implemented by any type of display, such as a liquid crystal display, etc. Although not shown, the computing device 100 can also include an audio output mechanism, a haptic (e.g., vibratory) output mechanism, etc.

The input mechanisms 104 can include touch input mechanism(s) 106 and pen input mechanism(s) 108. The touch input mechanism(s) 106 can be implemented using any technology, such as a resistive touch screen technology, capacitive touch screen technology, acoustic touch screen technology, bi-directional touch screen technology, and so on. In bi-directional touch screen technology, a display mechanism provides elements devoted to displaying information and elements devoted to receiving information. Thus, a surface of a bi-directional display mechanism is also a capture mechanism. The touch input mechanism(s) 106 and the pen input mechanism(s) 108 can also be implemented using a pad-type input mechanism that is separate from (or at least partially separate from) the display mechanism 102. A pad-type input mechanism is also referred to as a tablet, a digitizer, a graphics pad, etc.

The pen input mechanism(s) 108 can be implemented using any technology, such as passive pen technology, active pen technology, and so on. In the passive case, the computing device 100 detects the presence of the pen device when it touches (or is proximal to) the display surface. In that case, the pen device may represent simply an elongate implement having no independent power source and no processing functionality, or it may be passively powered by inductive coupling with the display mechanism 102. In the active case, the pen device can incorporate independent detection functionality for sensing its position with respect to the display surface. Further, the active pen device can include independent movement sensing mechanisms. Further, the active pen device can include independent depth sensing mechanisms, such as a beacon which measures a distance of the pen device from the computing device 100. In these examples, the active pen device can forward its input data to the computing device 100 for analysis. In the following description, it is to be understood that input data regarding the pen device can originate from the computing device 100, the pen device itself, or a combination thereof.

The input mechanisms 104 also include various types of movement-type input mechanism(s) 110. The term movement-type input mechanism describes any type of input mechanism that measures the orientation or motion of the computing device 100, or both. The movement type input mechanism(s) 110 can be implemented using linear accelerometers, gyroscopic sensors ("gyro devices" according to the terminology used herein), vibratory sensors tuned to various motion frequency bandwidths, mechanical means to detect specific postures or movements of the computing device 100 or parts of the computing device 100 relative to gravity, torque sensors, strain gauges, flex sensors, optical encoder mechanisms, and so on. Furthermore, any movement-type input mechanism can sense movement along any number of spatial axes. For example, the computing device 100 can incorporate an accelerometer and/or a gyro device that measures movement along three spatial axes.

The input mechanisms 104 also can include any type of image sensing input mechanism(s) 112, such as a video capture input mechanism, a stereo image capture mechanism, and so on. The input mechanisms 104 can also include one or more depth sensing mechanisms, some of which can be implemented by image sensing input mechanism(s) 112 (and some of which can be implemented into the pen device itself, as noted above). A depth sensing mechanism measures the distance of objects from some part of the computing device 100. For example, in one case, a depth sensing mechanism measures the distance of objects from the display surface of the computing device 100. A depth sensing mechanism can be implemented using any type of capture technology (e.g., time-of-flight technology) in conjunction with any type of electromagnetic radiation (e.g., visible spectrum radiation, infrared spectrum radiation, etc.). The realm of depth sensing mechanisms may therefore encompass some of the image sensing input mechanism(s) 112.

More specifically, some of the depth sensing mechanisms can provide a general indication that some object is located above the display surface (or other part of the computing device 100). Other of the depth sensing mechanisms can determine a general (aggregate) indication of a distance of the object from the display surface. Other of the depth sensing mechanisms can assess the distance in a more fine-grained manner, such as by providing a per-pixel indication of the distance of the object above the display surface, etc. In the examples which follow, particular objects of interest include the user's hand and a pen device which the user may be holding; the computing device 100 can independently assess the distances of both of these objects from the computing device 100.

Although not specifically enumerated in FIG. 1, other input mechanisms can include a keypad input mechanism, a mouse input mechanism, a voice input mechanism, and so on.

In the terminology used herein, each input mechanism is said to generate an input event when it is invoked by the user. For example, when a user touches the display surface of the display mechanism 102 (or other part of the computing device 100), the touch input mechanism(s) 106 generates touch input events. When the user applies a pen device to the display surface, the pen input mechanism(s) 108 generates pen input events. For ease and brevity of reference, the following explanation will most often describe the output of an input mechanism in the plural, e.g., as "input events." However, various analyses can also be performed on the basis of a singular input event.

FIG. 1 depicts the input mechanisms 104 as partially overlapping the display mechanism 102. This is because at least some of the input mechanisms 104 may be integrated with functionality associated with the display mechanism 102. This is the case with respect to the touch input mechanism(s) 106 and the pen input mechanism(s) 108. For example, the touch input mechanism(s) 106 relies, in part, on functionality provided by the display mechanism 102.

An interpretation and behavior selection module (IBSM) 114 receives input events from the input mechanisms 104. Namely, it collects the input events over the course of an input action in which information is entered into the computing device 100, either deliberately or unintentionally, or a combination thereof. As the name suggests, the IBSM 114 performs the task of interpreting the input events to determine the nature of the input events. After performing its interpretation role, the IBSM 114 performs behavior associated with the interpreted input events. More specifically, the IBSM 114 analyzes the input events to determine whether at least part of the input action (associated with the input events) represents an inadvertent action. Is so, the IBSM 114 takes steps to counteract the effects of the inadvertent action.

Finally, the computing device 100 may run one or more applications 116 received from any application source or sources. The applications 116 can provide any higher-level functionality in any application domain. Further, the applications 116 can leverage the functionality of the IBSM 114 in various ways, such as by defining new ways of recognizing and addressing inadvertent contact, etc.

In one case, the IBSM 114 represents a separate component with respect to applications 116. In another case, one or more functions attributed to the IBSM 114 can be performed by one or more applications 116. For example, in one implementation, the IBSM 114 can interpret an input scenario, while an application can select and execute behavior that is based on that interpretation. Accordingly, the concept of the IBSM 114 is to be interpreted liberally herein as encompassing functions that can be performed by any number of components within a particular implementation.

Figure 2:
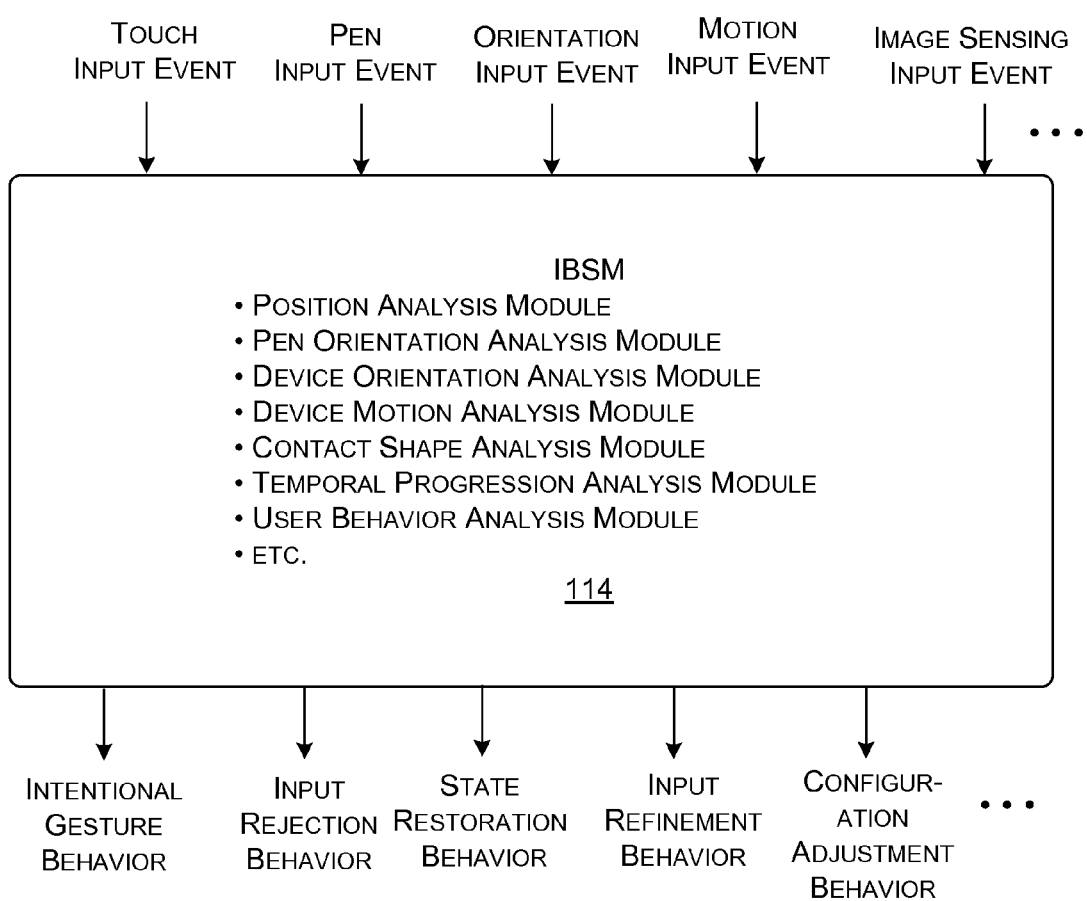
FIG. 2 shows an interpretation and behavior selection module (IBSM) used in the computing device of FIG. 1.

FIG. 2 shows another depiction of the IBSM 114 introduced in FIG. 1. As shown in FIG. 2, the IBSM 114 receives various input events. For example, the IBSM 114 can receive touch input events, pen input events, orientation input events, motion input events, image sensing input events, and so on. In response to these events, the IBSM 114 provides various output behaviors. For example, the IBSM 114 can execute various commands in response to detecting an intentional gesture. Alternatively, or in addition, the IBSM 114 can reject contact input events in a rejection operation if it determines that an input action was unintentional, at least in part. Alternatively, or in addition, the IBSM 114 can restore a state to a point prior to the occurrence of an unintentional input action. Alternatively, or in addition, the IBSM 114 can correct an interpretation of contact input events to remove effects of inadvertent contact. Alternatively, or in addition, the IBSM 114 can adjust the configuration of the computing device 100 in any way based on its understanding of the input action, e.g., so as to more efficiently receive additional intentional contact input events and minimize the impact of additional unintentional contact input events, e.g., by desensitizing the computing device 100 to further unintentional contact input events.

To function as described, the IBSM 114 can incorporate a suite of analysis modules, where the detection and classification of different input scenarios may rely on different respective analysis modules. Any analysis module can rely on one or more techniques to classify the input events, including pattern-matching techniques, rules-based techniques, statistical techniques, and so on. For example, an input scenario can be characterized by a particular telltale pattern of inputs events. To classify a particular sequence of input events, a particular analysis module can compare those input events against a data store of known patterns. Further, an analysis module can continually test its prior conclusions with respect to new input events that arrive during the course of an input action.

In the case of FIG. 2, the IBSM 114 can include a position analysis module, a pen orientation analysis module, a device orientation analysis module, a device motion analysis module, a contact shape analysis module, a temporal progression analysis module, and a user behavior analysis module, among other possible modules. The ensuing description will explain the functions performed by these modules.

Figure 3:
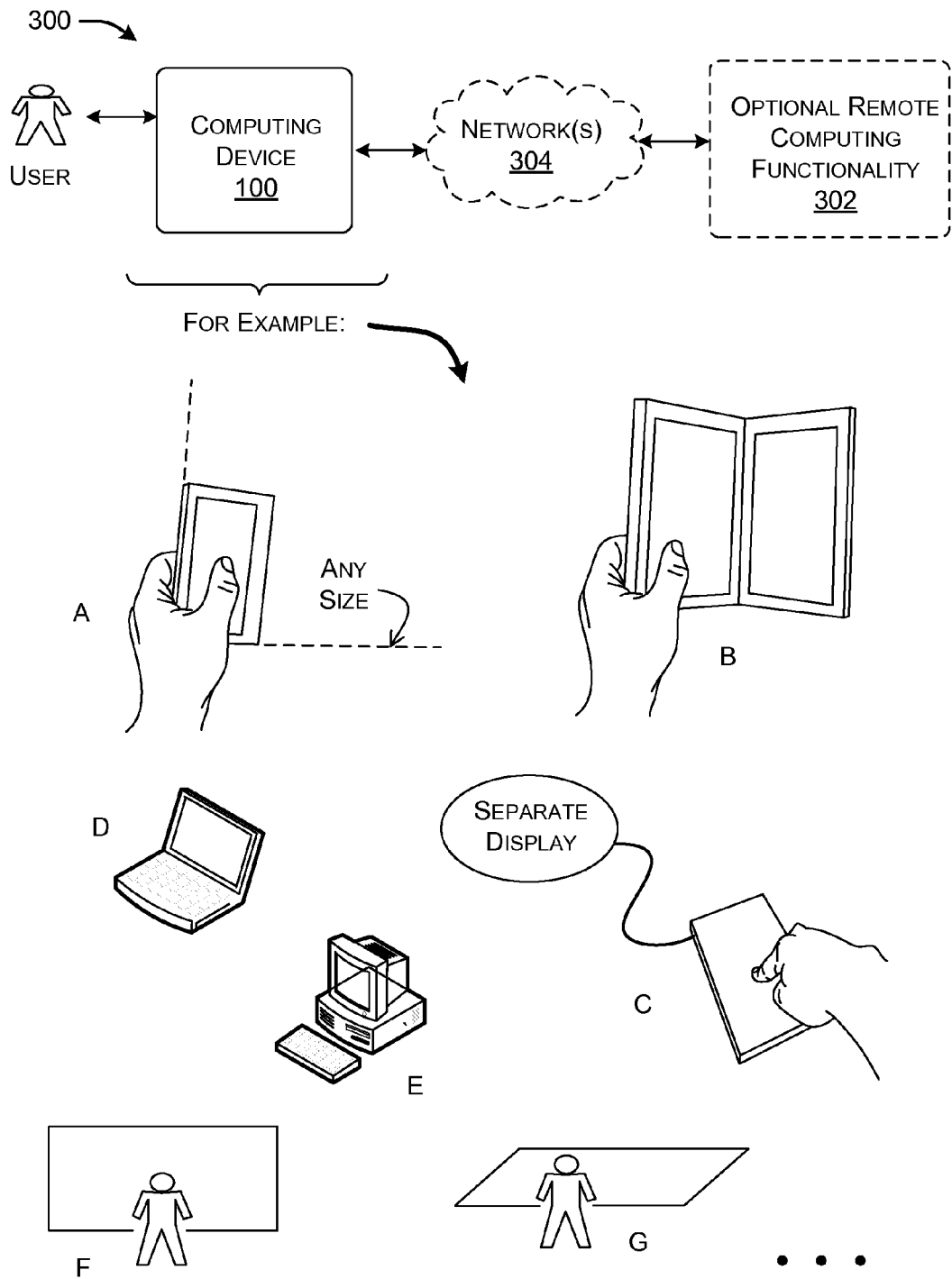
FIG. 3 shows an illustrative system in which the computing device of FIG. 1 can be used.

FIG. 3 shows an illustrative system 300 in which the computing device 100 of FIG. 1 can be used. In this system 300, a user interacts with the computing device 100 to provide input events and receive output information. The computing device 100 can be physically implemented as any type of device, including any type of handheld device as well as any type of traditionally stationary device. For example, the computing device 100 can be implemented as a personal digital assistant, a mobile communication device, a pad-type device, a book reader device, a handheld game device, a laptop computing device, a personal computer device, a work station device, a game console device, a set-top box device, and so on. Further, the computing device 100 can include one or more device parts, some of which may have corresponding display surface parts.

FIG. 3 also depicts a representative (but non-exhaustive) collection of implementations of the computing device 100. In scenario A, the computing device 100 is a handled device having any size. In scenario B, the computing device 100 is a book-reader device having multiple device parts. In scenario C, the computing device 100 includes a pad-type input device, e.g., whereby a user makes touch and/or pen gestures on the surface of the pad-type input device rather than (or in addition to) the display surface of the display mechanism 102. The pad-type input device can be integrated with the display mechanism 102 or separate therefrom (or some combination thereof). In scenario D, the computing device 100 is a laptop computer having any size. In scenario E, the computing device 100 is a personal computer of any type. In scenario F, the computing device 100 is associated with a wall-type display mechanism. In scenario G, the computing device 100 is associated with a tabletop display mechanism, and so on.

In one scenario, the computing device 100 can act in a local mode, without interacting with any other functionality. Alternatively, or in addition, the computing device 100 can interact with any type of remote computing functionality 302 via any type of network 304 (or networks). For instance, the remote computing functionality 302 can provide applications that can be executed by the computing device 100. In one case, the computing device 100 can download the applications; in another case, the computing device 100 can utilize the applications via a web interface or the like. The remote computing functionality 302 can also implement any aspect or aspects of the IBSM 114. Accordingly, in any implementation, one or more functions said to be components of the computing device 100 can be implemented by the remote computing functionality 302. The remote computing functionality 302 can be physically implemented using one or more server computers, data stores, routing equipment, and so on. The network 304 can be implemented by any type of local area network, wide area network (e.g., the Internet), or combination thereof. The network 304 can be physically implemented by any combination of wireless links, hardwired links, name servers, gateways, etc., governed by any protocol or combination of protocols.

A.2. Illustrative Factors Used to Analyze Input Events

In operation, the IBSM 114 uses any combination of a plurality of factors to determine whether at least part of an input action represents an inadvertent action. In summary, the factors can include any one or more of: position information that indicates a position of at least one of a hand (or hands) and a pen device during the input action; pen orientation information which indicates an orientation at which a pen device is held in the hand during the input action; device orientation information that indicates an orientation of the computing device 100 during the input action; device motion information that indicates motion of the computing device 100 during the input action; contact shape information which indicates a shape associated with the touch input events; progression information which indicates a temporal progression associated with the application of input events; and user behavior information which indicates a manner in which a user is performing the input action, and so on.

The following explanation sets forth examples of these factors. To begin with, consider FIG. 4 which shows a typical manner in which a user may approach a display surface 402 of the computing device 100 with a pen device 404 held in hand 406. The user may intend to make a mark on the display surface, such as to add a note.

At time A, assume that the user has not yet made contact with the display surface 402, but that a depth sensing mechanism (referred to in the singular form for brevity) can at least determine the presence of the distal portion 408 of the approaching pen device 404, and perhaps some portion 410 of the hand 406, such as the side of the pinky finger of the hand 406.

At time B, assume that the user has made a first inadvertent contact with the display surface 402. For example, the user may brush against the display surface with the side of the user's pinky finger 412. At this point, the depth sensing mechanism can capture more information regarding the pen device 404 and the approaching hand 406, although these portions have not yet made contact with the display surface 402.

A time C, assume that the user finally makes contact with the display surface 402 with the tip 414 of the pen device 404. At this point, assume that the user has now fully rested his palm 416 on the display surface 402. The depth sensing mechanism can also capture more information regarding the pen device 404 and the hand 406, although these portions are not in contact with the display surface 402.

Figure 5:
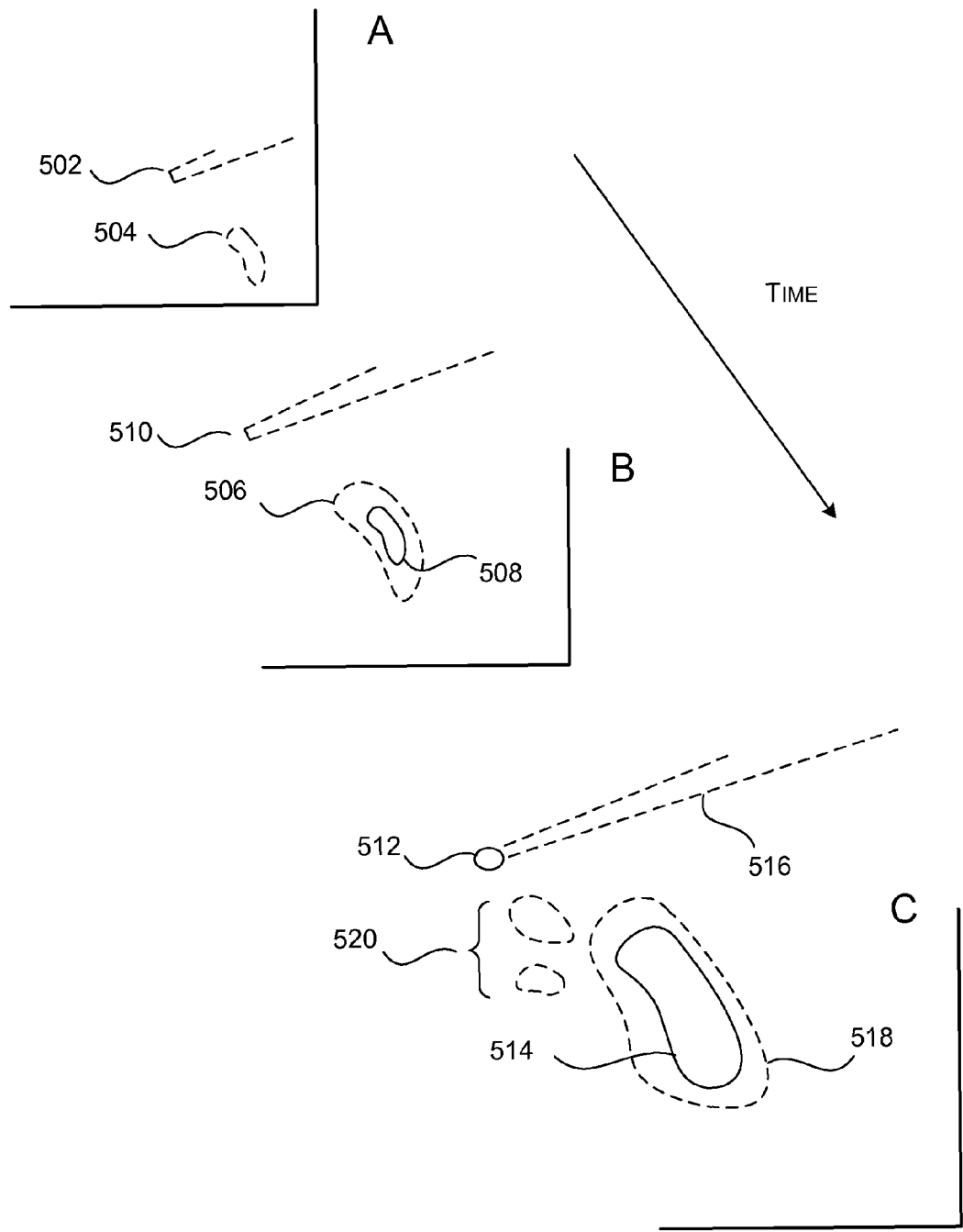
FIG. 5 shows input events that may be captured by the computing device at different junctures of the trajectory shown in FIG. 4.

FIG. 5 represents input events that can be captured at the three junctures (A, B, and C) described above. The dashed lines enclose information that is captured by the depth sensing mechanism, representing possible imminent contact of the hand with the display surface 402. The solid lines enclose information that is captured by the touch input mechanism(s) 106, representing actual contact of the hand with the display surface.

As indicated at time A, the depth sensing mechanism can capture input events 502 representing the distal portion 408 of the pen device 404. The depth sensing mechanism can also capture input events 504 that represents a portion 410 of the hand 406. At time B, the depth sensing mechanism captures input events 506 representing a larger portion of the hand 406, while the touch input mechanism(s) 106 captures input events 508 that represents contact between the user's pinky finger 412 and the display surface 402. Also, the depth sensing mechanism can capture input events 510 representing a larger portion of the pen device 404.

At point C, the pen input mechanism(s) 108 can register input events 512 that represents contact of the pen tip 414 with the display surface 402. The touch input mechanism(s) 106 can register input events 514 that represents a larger portion of the hand 406 (compared to time B), including the palm 416 of the user. At this time, the depth sensing mechanism can also capture input events 516 that represents a larger portion of the pen device 404, input events 518 that represents a larger portion of the hand 406, and perhaps input events 520 that represents a portion of the fingers.

Figure 4:
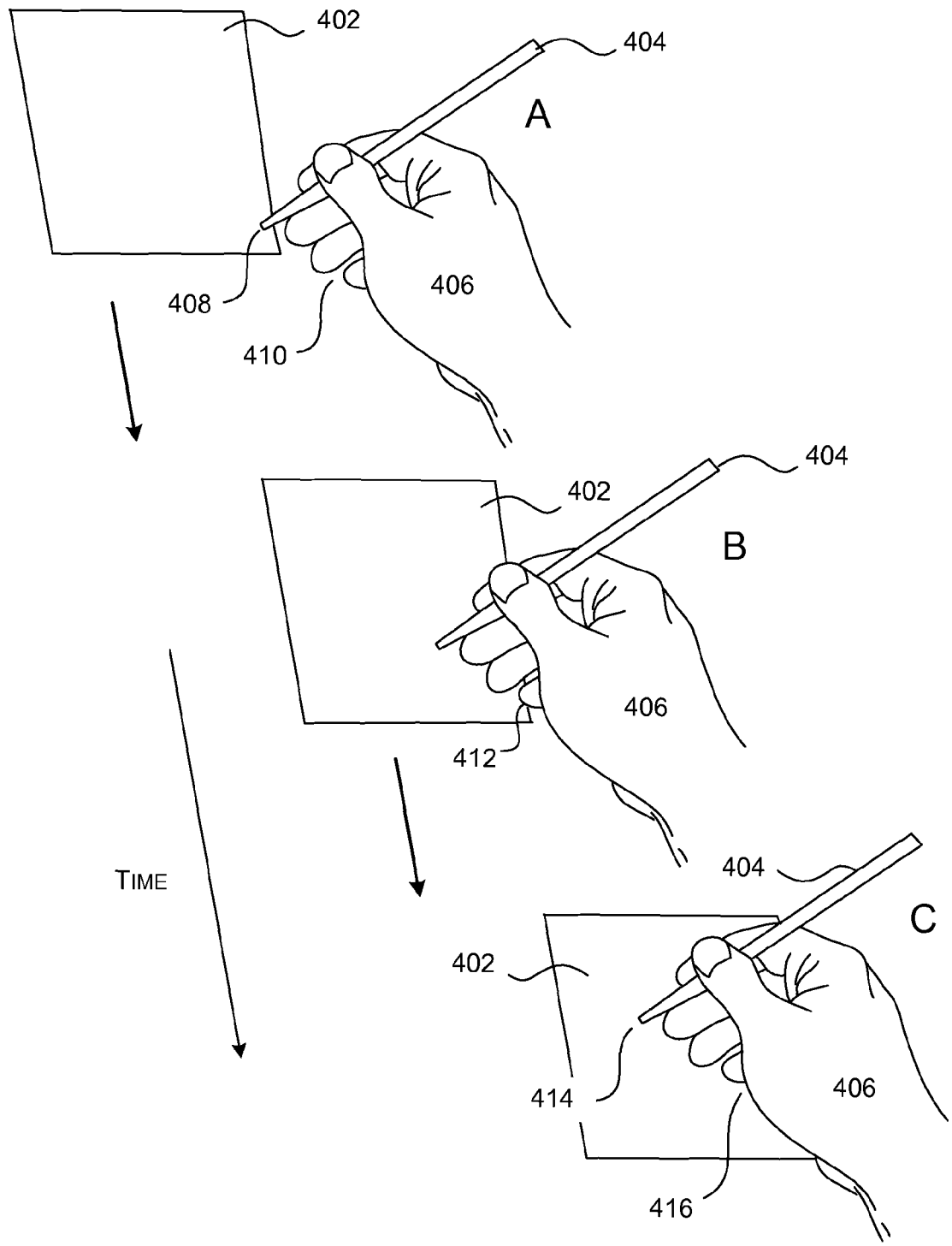
FIG. 4 shows a trajectory of a hand to a display surface of a computing device, where that hand holds a pen device.

In general, the progression of input events shown in FIGS. 4 and 5 constitutes an input action in the terminology used herein. However, this progression is merely representative. Other users may interact with the display surface 402 in a different manner, e.g., based on their habits and the like. This will generate different types of hand trajectories and different resultant input events.

Although not shown, the computing device 100 can also receive and analyze input events that are captured as the user withdraws his or her hand (and pen device) from a display surface or other marking surface (e.g., after making a mark with the pen device). In one implementation, these events are relevant to the proper interpretation of an input action, helping to determining whether parts of the input action represent inadvertent contact(s). Such post-contact input events can be considered as a phase of the input action itself.

FIGS. 4 and 5 serve as vehicle for now describing several factors that the IBSM 114 may use to determine whether the illustrated input action is inadvertent.

(a) Position Information. The IBSM 114 can determine the position(s) of the user's hand (or hands) above the display surface 402 (or other part of the computing device 100) over the course of the input action. In addition, or alternatively, the IBSM 114 can independently determine the position(s) of the pen device 404 above the display surface 402 (or other part of the computing device 100). The IBSM 114 can determine this information based on input events received from any of the depth sensing mechanisms. The depth sensing mechanisms can generate aggregate distance measures or a fine-grained multi-point distance measures, or both.

The IBSM 114 can leverage the position information based on several possible heuristics. In one case, the IBSM 114 may indicate that a touch contact that occurs while the pen device 404 is close to the display surface 402 is likely to represent inadvertent contact activity. The assumption here is that the user likely intends to use the pen device 404 to make an input, not a finger. The IBSM 114 may also indicate that a touch contact that occurs while the pen device 404 is far from the display surface 402 is likely to represent inadvertent contact activity. For example, in one scenario, this touch contact may be attributed to an accidental contact made using the opposite hand (e.g., the hand which does not hold the pen device 404). This scenario illustrates that the computing device 100 can monitor all objects in proximity to or in contact with the display surface 402 or other parts of the computing device 100, regardless of their origin.

(b) Pen orientation information. The IBSM 114 can determine the angle at which the user holds the pen device 404 upon approaching the display surface 402. For instance, the IBSM 114 can determine this information based on input events received from any of the image sensing input mechanism(s) 112, any of the depth sensing mechanisms, and so on. The IBSM 114 can use to this information to infer whether the user intends to use the pen device 404. The IBSM 114 can use this insight, in turn, to infer the likelihood that touch input events are legitimate or accidental.

Figure 6:
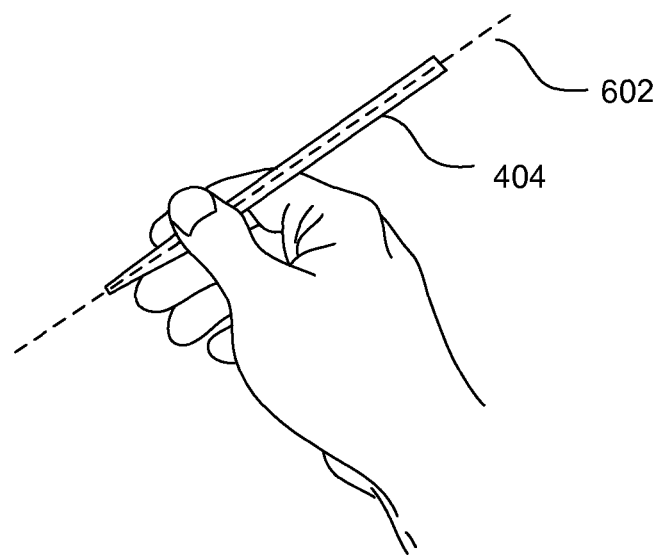
FIGS. 6 and 7 shows two ways in which a pen device is typically held while interacting with a display surface of a computing device, corresponding to two different goals that the user seeks to achieve.
Figure 7:
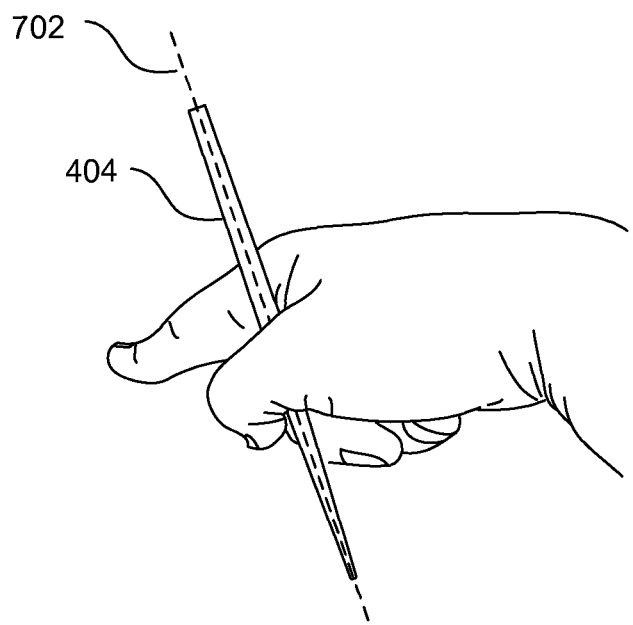

For example, consider a first scenario shown in FIG. 6 versus a second scenario shown in FIG. 7. In FIG. 6 the user intends to use the pen device 404 to make a mark on the display surface. As such, the user approaches the display surface 402 by leading with the distal portion 408 of the pen device 404. This constitutes a first orientation 602 of the pen device 404. In FIG. 7, by contrast, the user intends to touch the display surface 402 with a finger and is merely holding the pen device 404 in a convenient posture such that it will not interfere with his actions. This establishes a second orientation 702. Based on pen orientation information, the IBSM 114 is more likely to interpret touch input events as inadvertent for the scenario of FIG. 6, compared to the scenario of FIG. 7. Other telltale pen orientations are possible. For example, a user may hold the pen in a hand in a manner which indicates that he or she plans to make a pinch-to-zoom gesture with his or her fingers, and so on.

(c) Progression information. The IBSM 114 can determine the manner in which the hand 406 and the pen device 404 approach the display surface 402. The IBSM 114 can determine this information based on input events received from any of the image sensing input mechanism(s) 112, any of the depth sensing mechanisms, etc., together with contact input events provided by the touch input mechanism(s) 106 and/or the pen input mechanism(s) 108. The IBSM 114 can use this information to determine whether the trajectory of the hand 406 and the pen device 404 are indicative of a deliberate attempt to engage the display surface 402, or an accidental contact with the display surface 402. For example, the user in the example of FIG. 4 makes a straight advance to the computing device, rather than a sweeping or glancing motion that may be indicative of an inadvertent brushing contact. This characteristic may therefore weigh against concluding that the touch input events are accidental. However, the progression information also indicates that the user has made a kind of skidding landing upon approaching the display surface 402, which is suggestive of a typical inadvertent contact. In another example, the user can make a touch contact, followed soon thereafter by a pen contact that is located close to the touch contact. The IBSM 114 can interpret the touch input of this sequence as likely representing an inadvertent contact.

Progression information can therefore represent different characteristics of the pen device and the user's hand as it approaches the display surface. Such information can represent, at any particular moment, the positions of the pen device 404 and the hand with respect to the display surface 402, the orientation of the pen device 404, and so on. Hence, the progression information can be constructed, in part, from at least the above-described position information and orientation information.

(d) User Behavior Information. Users may exhibit particular patterns of behavior when they make input actions, reflected by behavior information. The IBSM 114 can leverage such behavior information to help determine whether parts of a currently-observed input action are deliberate or inadvertent. More specifically, the user behavior information can include at least two classes of behavior. A first class identifies universal patterns of behavior that can be used to interpret the behavior of any user. For example, two respective patterns in this class can identify, respectively, a typical manner in which a right-handed user and a left-handed user may approach the display surface 402 to make a mark using the pen device 404. This information is referred to as handedness information herein. The IBSM 114 can leverage this information to determine whether a current series of input events produced by a particular user represents a normal or abnormal input pattern for this person. In one case, the IBSM 114 can determine the characteristics of a user (e.g., whether the user is right-handed or left-handed) based on explicit information provided by the user, e.g., as supplied by the user in a registration procedure or the like. In another case, the IBSM 114 can infer the characteristics of the user, e.g., by repeated observations of the way in which the user typically performs input actions, and/or by a contemporaneous observation of the way in the user is currently interacting with the computing device 100.

A second class of patterns identifies behaviors that can be considered to be idiosyncratic to individual users. For example, different users can perform tap-and-drag gestures in different idiosyncratic ways that can be represented as respective behavioral patterns. The IBSM 114 can apply these insights in the manner specified above, e.g., by comparing a current series of input events produced by a particular user against the norms established for this particular person. The IBSM 114 can determine typical behavioral patterns for each person in any manner specified above, if so authorized by each respective person.

(e) Shape information. The IBSM 114 can determine the shape of the actual contacts based on touch input events and pen input events. The IBSM 114 can determine the shapes of imminent contacts from image sensing input events, depth sensing input events, etc. The IBSM 114 can use this information to determine whether any telltale shapes are present that indicate an inadvertent content has been made or is soon to be made. For instance, in the case of FIG. 5, the user's touch contact at time C covers a relatively large area, which itself speaks in favor of the input events being classified as accidental. In addition, the input events have an elongated shape which is indicative of an inadvertent palm contact. The IBSM 114 can also determine and utilize the orientations of the contact shapes. The IBSM 114 can also determine and utilize the positions of the contact shapes on the display surface 402.

Figure 8:
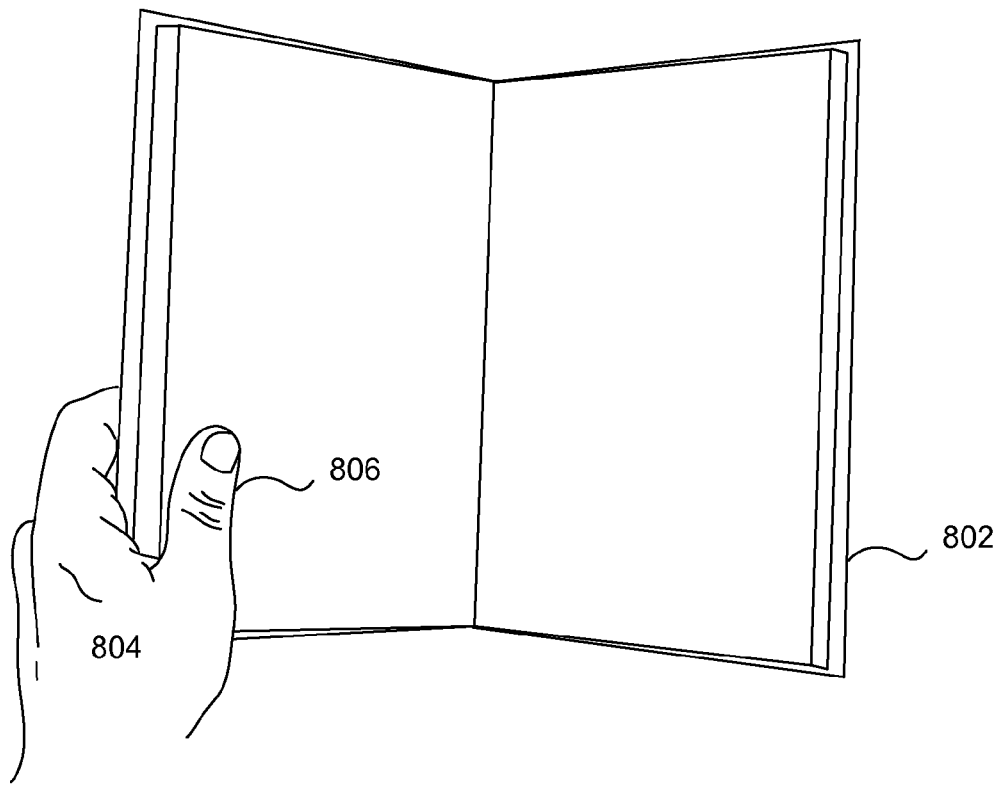
FIGS. 8 and 9 show two different orientations of a computing device, demonstrating how the orientation may influence the interpretation of touch input events.
Figure 9:
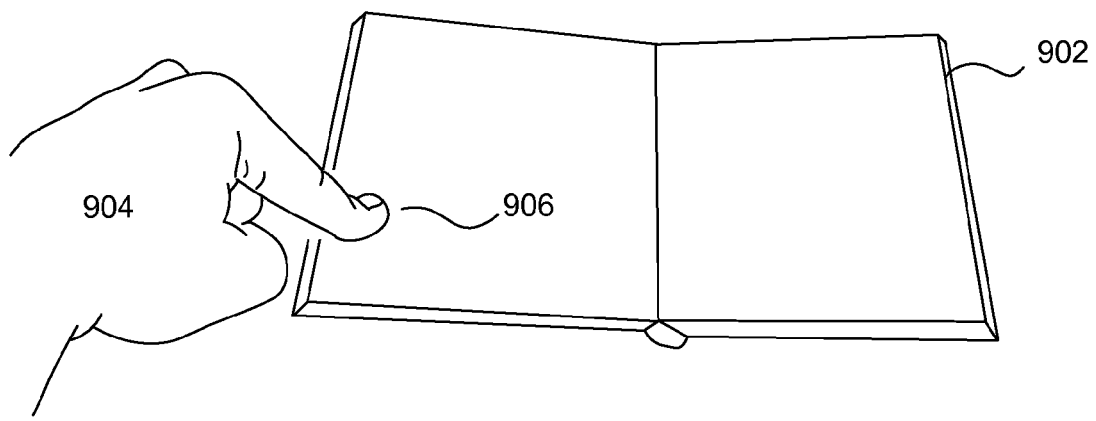

(f) Device orientation information. The IBSM 114 can determine the orientation of the computing device 100 that occurs while touch input events are received to help understand the nature of those events. For example, consider the example of FIG. 8 versus the example of FIG. 9. FIG. 8 shows a scenario in which the user holds a computing device 802 in a hand 804 during use. In this case, the user's thumb 806 may inadvertently contact the display surface of the computing device 802. In contrast, FIG. 9 shows a scenario in which the user rests a computing device 902 flat on a table or the like. The user then uses a hand 904 to press down an index finger 906 in the lower left corner of the display surface of the computing device 902. The IBSM 114 can examine the respective orientations of computing device 802 and computing device 902 and conclude that the thumb placement that occurs in FIG. 8 is more likely to be inadvertent compared to the finger placement shown in FIG. 9. This is because it is natural for the user to hold the computing device 802 in the manner shown in FIG. 8 when holding it aloft. But it is less likely to accidently place a single finger on the display surface when the computing device 902 is lying flat in the manner shown in FIG. 9. The IBSM 114 can detect the orientation of the computing devices (802, 902) based on orientation input events received from the movement-type input mechanism(s) 110.

(g) Motion Information. The IBSM 114 can determine the dynamic motion of the computing device 100 at the time touch input events are received, e.g., based on motion input events received from the movement-type input mechanism(s) 110, including mechanisms such as accelerometers and gyros devices. The IBSM 114 can then determine whether motion-related issues may have a bearing on the interpretation of an input action. The IBSM 114 can also receive and analyze motion information before and/or after a contact input has occurred.

For example, the IBSM 114 can consider background movement information when analyzing an input action. In one case, the background movement may reveal minimal background motion, indicating that the computing device 100 may be resting on a desk or the like. In a second case, the background movement may indicate small background motion, indicating, perhaps, that the computing device 100 is being held in a hand. Less steady background movements may be indicative of operating the computing device 100 while walking or riding in a vehicle, etc. The IBSM 114 can take this background "noise" into account when interpreting all forms of input provided by the input mechanisms 104.

Furthermore, a contact input produces collateral or secondary movement input events. The IBSM 114 can use these secondary movement input events to reason about the nature of a contact input that has occurred. For example, the IBSM 114 can indicate that a touch with no associated motion disturbance may be associated with a very light brushing of the display surface, which is likely to be accidental.

The IBSM 114 can also receive and analyze motion information associated with the pen device 404 and/or hand(s) of the user. For example, the pen device 404 can include embedded accelerometers and gyros devices, and/or other sensors; those mechanisms can yield information regarding the motion of the pen in the course of an input action.

To repeat, the above indicated factors are representative, rather than exhaustive. Also, computing devices that have particular structures can capture corresponding factors that are associated with their structures. For example, a device having two display parts (e.g., as in the case of a dual-screen reading device) can determine and utilize information which indicates whether the user has simultaneously made contact with both display parts, as well as the relative angle between those parts. Also, the IBSM 114 can take contextual factors into account. One such contextual factor indicates the type of application that the user is interacting with at the time contact input events occur.

The IBSM 114 can process the above-noted factors in any way. For example, in one case, the IBSM 114 can generate a score for input events which indicates the likelihood of the events being an accidental input based on a weighted combination of the factors described above. The IBSM 114 can also use other analysis modules to perform its analysis, such as a rules-based analysis engine, a neural network tool, a statistical analysis tool, and so forth.

Figure 10:
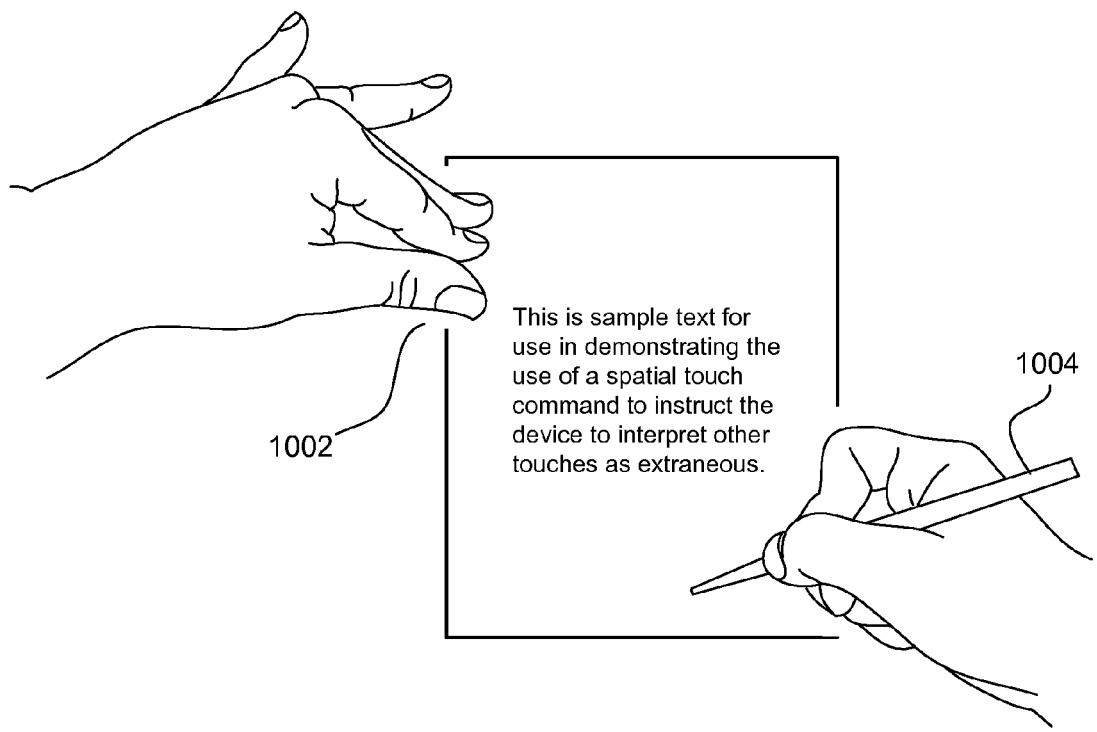
FIG. 10 shows a multi-touch gesture that can be applied to the display surface of a computing device to instruct the computing device to ignore touch input events.

FIG. 10 shows one way in which a user can guide the IBSM 114 in analyzing an input action, e.g., by providing override information. In this case, the user has applied an idiosyncratic three-finger gesture 1002 to a corner of a display surface. The IBSM 114 can interpret this gesture 1002 as a command to ignore all subsequent touch input events during the application of the gesture 1002. This will allow the user to freely make notes with a pen device 1004 without the risk of generating accidental inputs. In effect, the gesture 1002 establishes a lock that precludes the acceptance of touch input events. The user can remove the gesture 1002 to remove the lock. Users may regard this type of behavior as "natural" and easy to remember because users sometimes "hold down" a sheet a paper with the off-hand while writing on it. Further, the touch gesture made with the off-hand will not readily be interpreted as other common touch gestures, such as various two-finger pinch gestures.

In another case, the IBSM 114 can accommodate a tap or touch-and-hold gesture. Such a gesture can be used to toggle objects between a "locked" state (e.g., where dragging does not disturb the position of the object(s), and an "edit" state where objects can be freely manipulated.

Having assessed the nature of the input action, the IBSM 114 can perform one or more behaviors to attempt to rectify any accidental inputs. In one case, the IBSM 114 can ignore at least part of touch input events that have been assessed as accidental. In another case, the IBSM 114 can modify the interpretation of input events to remove effects caused by at least part of the input action that has been assessed as accidental.

Figure 11:
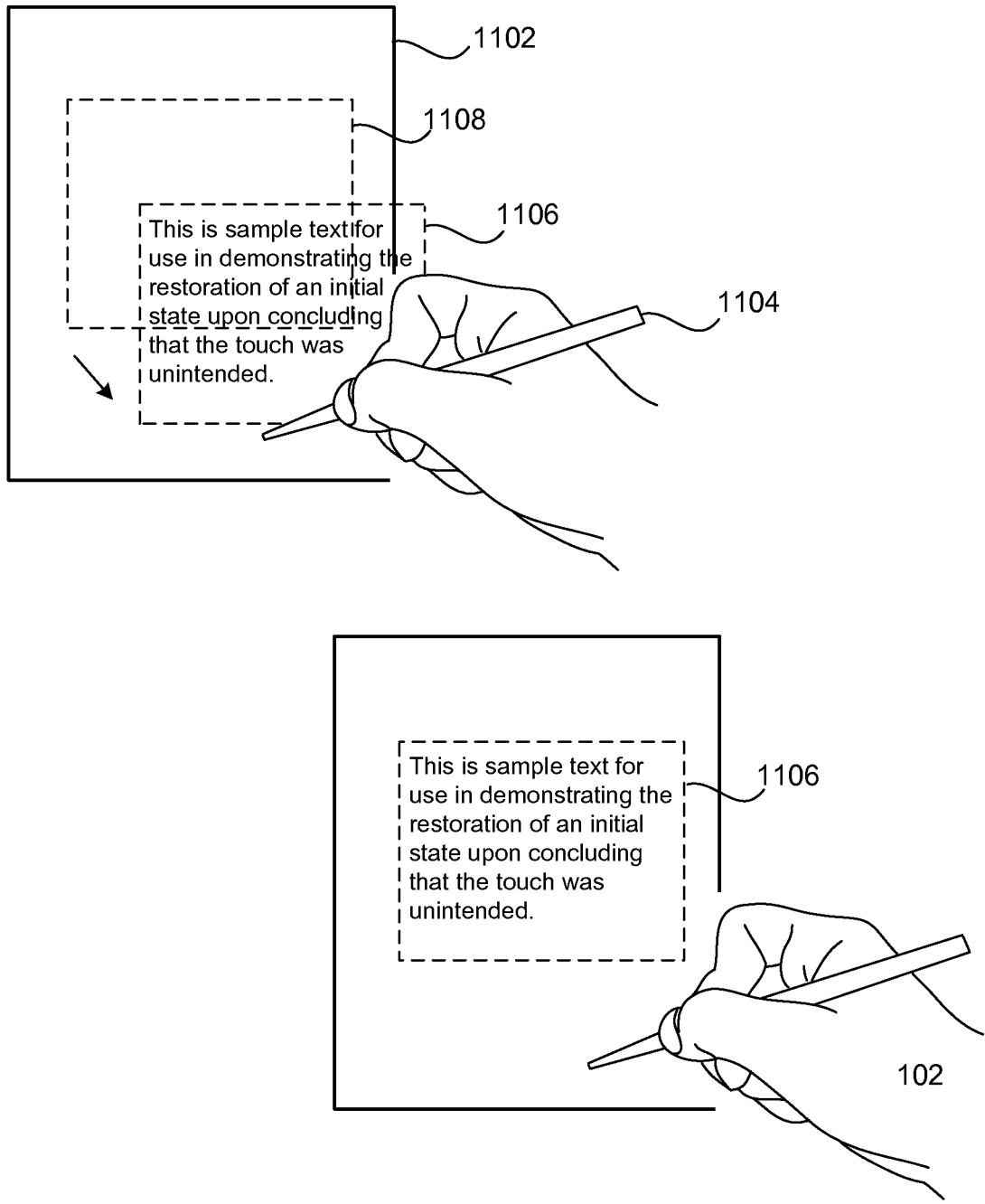
FIG. 11 shows a state restoration action that the computer device may perform when it concludes that touch input events are inadvertent.

In another case, the IBSM 114 can restore a display state and/or application state to a point prior to the onset of an inadvertent action. For example, consider the case of FIG. 11. Here the user has brushed up against a display surface 1102 when removing a pen device 1104 from the display surface. The IBSM 114 may not be able to immediately recognize the input action as accidental. As such the IBSM may interpret the input events as a request to drag the content 1106 on the display surface 1102 towards the lower right corner of the display surface.

At some point, however, assume that the IBSM 114 concludes that the touch input events were inadvertent. To address this issue, the IBSM 114 can restore the content 1106 to its original position, as shown in the lower part of FIG. 11. Prior to this correction, the IBSM 114 can display any type of visual cue to indicate the original state of the content 1106, such as by presenting a border, blur, or shadow 1108 to indicate the original position of the content 1106. If the IBSM 114 determines that the input was accidental, the IBSM 114 snaps the content 1106 back to the original position; if the input was intentional, then the IBSM 114 can remove the shadow 1108 after a prescribed amount of time (e.g., a few seconds in one case), and/or after a contact-up event or the like (in which the user removes a contact from the display surface). In another case, the IBSM 114 can delay the dragging motion shown in FIG. 11 until it determines (with a suitable degree of confidence) that the user is making a deliberate gesture. The IBSM 114 can also record behavior information which reflects the actions of the user. The IBSM 114 can later leverage this behavior information to improve its subsequent interpretation of input actions performed by this particular user.

In another case, the IBSM 114 can use the results of its analysis to perform a configuration action which configures the computing device 100 in a prescribed manner to receive subsequent input events, thereby enabling the computing device to more effectively address subsequent unintentional contact with the display surface. For example, the IBSM 114 can modify the sensitivity of the computing device 100, or change some other property of the computing device 100. For example, assume that the IBSM 114 uses the depth sensing mechanism to determine that the user is approaching a particular part of the display surface along a particular trajectory. The IBSM 114 can make that part of the display surface less sensitive to inadvertent contact, e.g., by raising touch detection thresholds or the like. Indeed, if the user is approaching with a pen device in hand, the IBSM 114 can temporarily turn off the touch input mechanism(s) 106 with respect to the projected region of contact. In other words, the IBSM 114 can anticipate probable outcomes of a user's present actions and make localized changes to reduce the risk of inadvertent contact. The computing device 100 can make these configuration changes on any level(s) of processing, e.g., by adjusting, for example, low-level parameters that affect the computing device 100, and/or by making changes which affect the subsequent processing of input events.

In the above examples, the IBSM 114 served primarily to identify inadvertent touch contact events that may be incidental to pen contact events. Alternatively, or in addition, the IBSM 114 can also provide analysis which determines the presence of inadvertent pen contact events, or any other types of contact events.

Further, in the above examples, the IBSM 114 serves primarily to remove or otherwise neutralize the effects of inadvertent contact events. Alternatively, or in addition, the IBSM 114 can make more constructive use of secondary-type input events, such as those caused when a user's palm contacts a display surface. For example, the IBSM 114 can detect a palm contact and use it as a reference point to improve the interpretation of other intended and unattended input events. The user can even leverage this manner of operation by deliberately applying his or her palm to the display surface of the computing device. The user can also, for example, apply a palm (or other hand portion) to one or more first objects to "hold" or "pin" down those first objects, while the user makes changes to second objects on the display surface. This operation prevents the user's manipulation of the second objects from interfering with the first objects. In these embodiments, it is assumed that the IBSM 114 can provide appropriate safeguards to prevent the palm contact from invoking unwanted input actions.

B. Illustrative Processes

Figure 12:
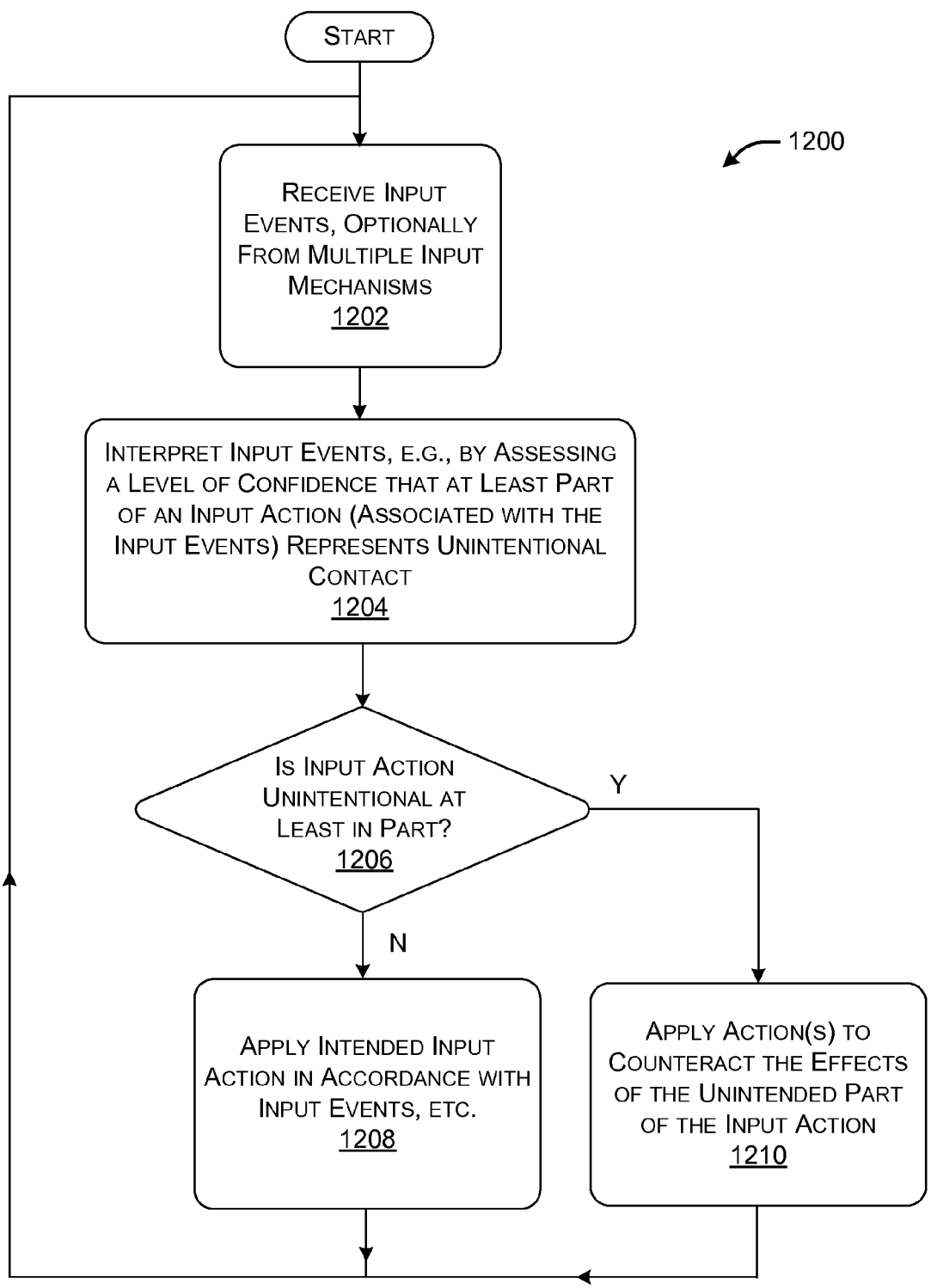
FIG. 12 shows a flowchart which explains one manner of operation of the computing device of FIG. 1.

FIG. 12 shows a procedure 1200 that explains the operation of the computing device 100 of FIG. 1. Since the principles underlying the operation of the computing device have already been described in Section A, certain operations will be addressed in summary fashion in this section.

In block 1202, the IBSM 114 receives input events, optionally from multiple input mechanisms. In blocks 1204 and 1206, the IBSM 114 interprets input events based on multiple factors, e.g., by determining whether the input events are indicative of an accidental input action. In block 1208, if the input action is assessed as intentional, then the IBSM 114 responds to the input events in a normal fashion, e.g., by executing a command corresponding to an intentional gesture made by the user. In block 1210, if the input action is assessed as accidental, then the IBSM 114 can apply any of the correction operations described in Section A.

The feedback loop indicates that the IBSM 114 can repeat its analysis over the course of an input action. In doing so, the IBSM 114 can gradually improve the confidence at which it interprets the input action. When the input action begins (e.g., corresponding to point A in FIG. 4), the IBSM 114 may be unable to accurately classify the input action. But at the completion of the action (e.g., at point C in FIG. 4), the IBSM 114 may be able to interpret the input action with a high degree of confidence. The IBSM 114 can also abandon an interpretation that no longer seems viable in view of new input events.

C. Representative Processing Functionality

FIG. 13 sets forth illustrative electrical data processing functionality 1300 that can be used to implement any aspect of the functions described above. With reference to FIG. 1, for instance, the type of processing functionality 1300 shown in FIG. 13 can be used to implement any aspect of the computing device. In one case, the processing functionality 1300 may correspond to any type of computing device that includes one or more processing devices. In all cases, the electrical data processing functionality 1300 represents one or more physical and tangible processing mechanisms.

The processing functionality 1300 can include volatile and non-volatile memory, such as RAM 1302 and ROM 1304, as well as one or more processing devices 1306. The processing functionality 1300 also optionally includes various media devices 1308, such as a hard disk module, an optical disk module, and so forth. The processing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In all cases, the computer readable medium 1310 represents some form of physical and tangible entity.

The processing functionality 1300 also includes an input/output module 1312 for receiving various inputs from a user (via input mechanisms 1314), and for providing various outputs to the user (via output modules). One particular output mechanism may include a display mechanism 1316 and an associated graphical user interface (GUI) 1318. The processing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described Habove are disclosed as example forms of implementing the claims.

What is claimed is:

1. A computing device, comprising:
   a display surface;
   plural input mechanisms for providing input events associated with an input action, including:
      a touch input mechanism for providing at least one touch input event that indicates contact of a hand with a display surface of the computing device,
      a pen input mechanism for providing at least one pen input event that indicates contact of a pen device with the display surface of the computing device, and
      at least one other input mechanism for providing at least one other input event;
   an interpretation and behavior selection module (IBSM) for receiving the input events;
   wherein the IBSM is configured to apply multiple factors to assess a level of confidence that at least part of the input action represents an unintentional contact with the display surface of the computing device;
   wherein the IBSM is configured to determine pen orientation information which indicates an orientation at which the pen device is held in the hand during a touch input event concurrent with at least one input event other than the touch input event, wherein the pen orientation information comprises one of the multiple factors;
   the IBSM being configured to apply at least one behavior to counteract effects of the unintentional contact, when the unintentional contact has been assessed.

2. The computing device of claim 1, wherein said at least one other input mechanism comprises one or more of an accelerometer and a gyro device.

3. The computing device of claim 1, wherein said at least one other input mechanism comprises an input mechanism that senses the hand at least one of prior to, during, and after contact of any object with the computing device.

4. The computing device of claim 1, wherein the unintentional contact occurs when a hand portion makes contact with a display surface of the computing device.

5. The computing device of claim 1, wherein the IBSM is configured to determine position information that indicates a position of at least one of the hand and pen device during the input action, wherein the position information comprises one of the multiple factors.

6. The computing device of claim 1, wherein the IBSM is configured to determine device orientation information that indicates an orientation of the computing device during the input action, wherein the device orientation information comprises one of the multiple factors.

7. The computing device of claim 1, wherein the IBSM is configured to determine contact shape information which indicates a shape associated with said at least one touch input event, wherein the shape information comprises one of the multiple factors.

8. The computing device of claim 1, wherein the IBSM is configured to determine progression information which indicates a temporal progression associated with application of any input events, wherein the progression information comprises one of the multiple factors.

9. The computing device of claim 1, wherein the IBSM is configured to determine user behavior information which indicates a manner in which a user is performing the input action, wherein the user behavior information comprises one of the multiple factors.

10. The computing device of claim 9, wherein the user behavior information includes handedness information which indicates whether the pen device is being held in a right or left hand.

11. The computing device of claim 1, wherein the IBSM is configured to determine override information which indicates an override command to ignore said at least one touch input event as being an unintentional touch contact, wherein the override information comprises one of the multiple factors.

12. The computing device of claim 11, wherein the IBSM is configured to interpret a prescribed touch gesture as the override command.

13. The computing device of claim 1, wherein the behavior comprises a rejection action which operates to ignore at least part of any input event associated with the unintentional contact.

14. The computing device of claim 1, wherein the behavior comprises a correction action in which an interpretation of the input action is modified to remove effects caused by said at least part of the input action associated with the unintentional contact.

15. The computing device of claim 1, wherein the behavior comprises a restoration action in which a state is restored to a state prior to application of said at least part of the input action associated with the unintentional contact.

16. The computing device of claim 1, wherein the behavior comprises a configuration action which configures the computing device in a prescribed manner to receive subsequent input events, thereby enabling the computing device to address subsequent unintentional contact with the computing device.

17. A method for detecting and addressing unintended contact with a display surface of a computing device, comprising:
   receiving input events from plural input mechanisms associated with an input action, at least one of the input mechanisms comprising a touch input mechanism for providing at least one touch input event that indicates contact of a hand with the display surface of the computing device;
   wherein the input mechanisms further include one or more of a pen input mechanism for providing at least one pen input event that indicates contact of a pen device with the display surface of the computing device and at least one other input mechanism for providing at least one other input event;
   evaluating multiple factors for assessing a level of confidence that at least part of the input action represents an unintentional contact with the display surface of the computing device;
   applying at least one behavior to counteract effects of the unintentional contact, when the unintentional contact has been assessed; and wherein said multiple factors include pen orientation information which indicates an orientation at which the pen device is held in the hand during a touch input event concurrent with at least one input event other than the touch input event and one or more of:
  position information that indicates a position of at least one of the hand and the pen device relative to the display surface of the computing device during the input action,
  device orientation information that indicates an orientation of the computing device during the input action,
  contact shape information which indicates a shape associated with said at least one touch input event,
  progression information which indicates a temporal progression associated with application of any input events, and
  user behavior information which indicates a manner in which a user is performing the input action.

18. The method of claim 17, wherein the unintentional contact occurs when at least one of a hand portion and the pen device makes contact with the display surface.

19. The method of claim 17, wherein the multiple factors include four or more of the position information, pen orientation information, device orientation information, device motion information, contact shape information, progression information, and user behavior information.

20. A computing device having computer readable instructions stored thereon, the computer readable instructions providing an interpretation and behavior selection module (IBSM) when executed by one or more processing devices, the computer readable instructions comprising:
  logic configured to receive input events from plural input mechanisms associated with an input action, at least one of the input mechanisms comprising a touch input mechanism for providing at least one touch input event that indicates contact of a hand with a display surface of the computing device;
  wherein the input mechanisms further include one or more of a pen input mechanism for providing at least one pen input event that indicates contact of a pen device with the display surface of the computing device and at least one other input mechanism for providing at least one other input event;
  logic configured to evaluate multiple factors to assess a level of confidence that at least part of the input action represents an unintentional contact with the display surface of the computing device;
  logic configured to apply at least one behavior to counteract effects of the unintentional contact, when the unintentional contact has been assessed; and
  wherein said multiple factors include pen orientation information which indicates an orientation at which the pen device is held in the hand during a touch input event concurrent with at least one input event other than the touch input event and one or more of:
    position information that indicates a position of at least one of the hand and the pen device relative to the display surface of the computing device during the input action;
    device orientation information that indicates an orientation of the computing device during the input action;
    contact shape information which indicates a shape associated with said at least one touch input event;
    progression information which indicates a temporal progression associated with application of any input events; and
    user behavior information which indicates a manner in which a user is performing the input action.

* * * * *